ated May 20, 1969

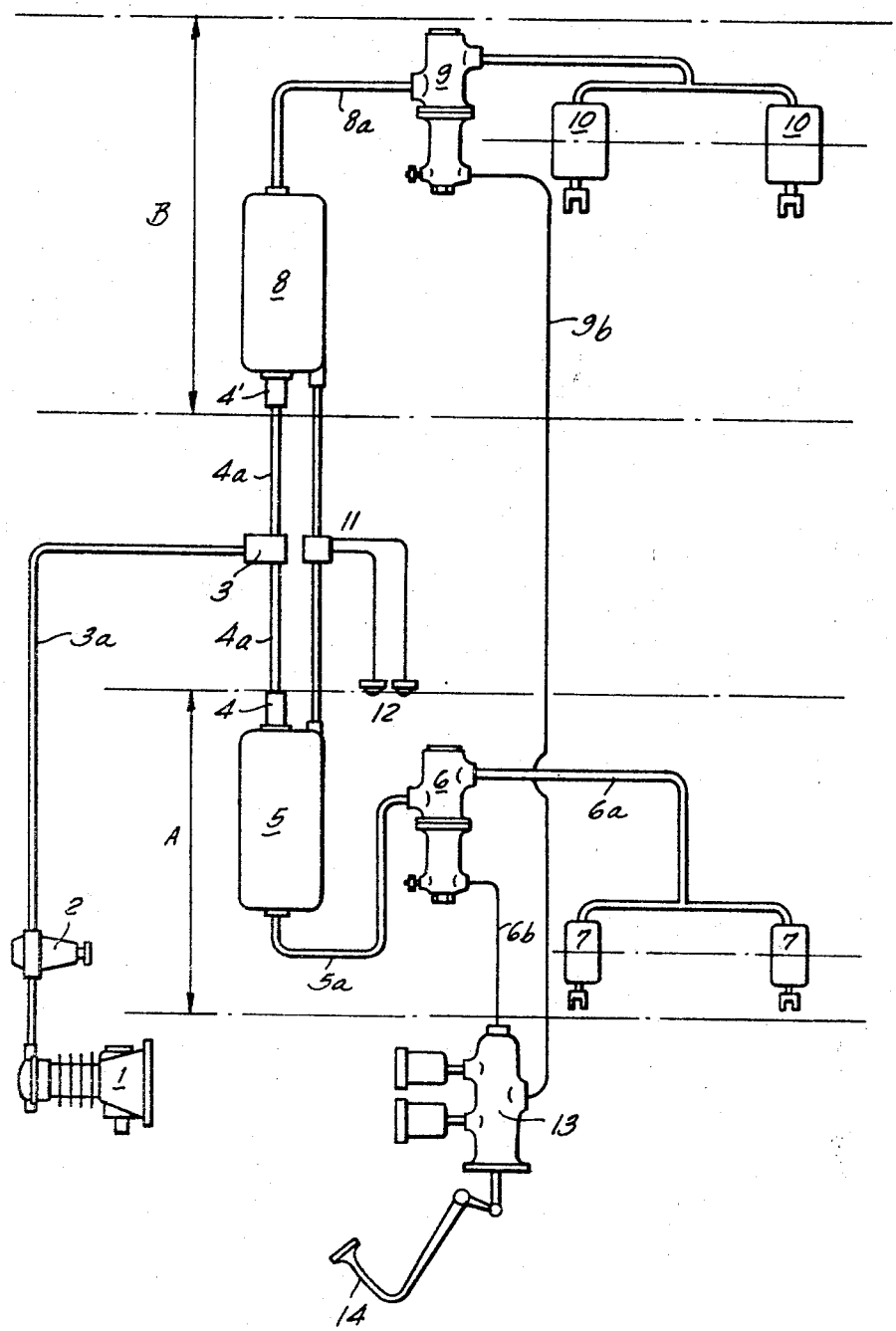

3,445,141
BRAKING ARRANGEMENT
Jean Mognet, Manuel S. Torello, and Carlos C. Rius,
Barcelona, Spain, assignors to Empresa Nacional de
Autocamiones, S.A., Madrid, Spain
Filed Feb. 6, 1967, Ser. No. 614,060
Claims priority, application Spain, Feb. 19, 1966,
323,316
Int. Cl. B60t 13/00, 13/74, 17/02
U.S. Cl. 303—6   4 Claims

ABSTRACT OF THE DISCLOSURE

A braking arrangement in which a source of pneumatic fluid is connected with pneumatically operated brake cylinders and in which a hydraulic control circuit is provided which includes a normally closed valve arranged in the conduit and also actuating means which, when operated, opens the valve so that the pneumatic fluid can pass from the source to the brake cylinders.

Background of the invention

The present invention relates to a braking arrangement, and more particularly to a braking arrangement for landborne vehicles. Still more specifically, the present invention relates to a braking arrangement in which pneumatic means are utilized for effecting operation of the brake cylinder or cylinders whereas hydraulic means are utilized for actuating the pneumatic means.

It is well known that there is a time lapse between the identification of an obstacle by the operator of a vehicle and the application of the vehicle brakes. The length of time which elapses differs, depending on the person involved. It is, however, believed that a reaction time of half a second is the fastest response which can be expected, at least from persons with average reflexes, that is the vast majority of drivers.

Unfortunately, the human reaction time is by no means the only factor determinative of the distance which the vehicle continues to travel before effective application of the brakes. Once the operator's reflex has caused him to actuate the brakes, there is another time lapse resulting from the mechanical response time of the braking system itself. Evidently, this additional period must be added to the minimum half-second reaction time of the driver, thus further prolonging the period of time for which the vehicle advances towards the obstacle without being checked in its progress.

The prior art shows that the mechanical response time is unnecessarily long, indicating the desirability of reducing this response time. It is well known how important it is to reduce the braking distance of a vehicle, but it is equally evident that the human reaction time cannot be reduced beyond a minimum factor which, as pointed out above, is believed to be one-half of one second. Therefore, to reduce the total braking distance, no other possibility exists but to reduce the mechanical response time of the braking system.

Summary of the invention

The present invention overcomes the disadvantages set forth and reduces the mechanical response time of a vehicle braking system.

A braking system constructed in accordance with the present invention has a response time which in no instance exceeds one-half of one second, and will actually have a response time which is considerably below that value.

To achieve this the present invention utilizes a pneumatic braking system which is actuated by a hydraulic control circuit whose response time is quicker than that of a pneumatic system or the response time of mechanical linkages.

In accordance with one feature of our invention we provide a braking arrangement which is particularly suitable for landborne vehicles, and which comprises a source of pneumatic fluid, and pneumatically operated brake cylinder means. In accordance with our invention, we further provide conduit means which connect the source with the brake cylinder means. Finally, a hydraulic control circuit is provided, and this included normally closed valve means arranged in the conduit means and actuating means which opens the valve means in response to operation of the actuating means.

It is clear from this that a significant reduction in the mechanical response time of the braking system is achieved in accordance with the present invention by utilizing the almost instantaneous response of a hydraulic control unit.

To further reduce the mechanical response time of the system with accordance to the present invention we provide for the arrangement of the valves which normally separate the brake cylinders from the source of pneumatic fluid, as close as possible to the respective brake cylinders so that when the valves have been opened, the path over which the pneumatic fluid has to travel to the brake cylinders is short.

The novel features which are considered as characteristic for the invention are set forth in particular in the appended claims. The invention itself, however, both as to its construction and its method of operation, together with additional objects and advantages thereof will be best understood from the following detailed description of specific embodiments when read in connection with the accompanying drawings.

Brief description of the drawing

The single figure is a somewhat diagrammatic illustration of a braking arrangement embodying the present invention.

Description of the preferred embodiment

Discussing now the drawing in more detail it will be seen that there is provided an air compressor 1 which is of course operated by the engine, which latter has been omitted as non-essential to an understanding of the invention. Reference numeral 2 indicates a pressure regulator which is so calibrated as to assure the minimum required surface pressure and to prevent the occurrence of overpressures in the system. Reference numeral 3 indicates a diverter valve which is connected with the pressure regulator via a conduit 3a. In turn, the diverter 3 is connected with two pressure vessels, such as air tanks 5 and 8, via two conduits 4a. The conduits 4a lead to one way valves, of which valve 4 is associated with the air tank 5 and valve 4′ with the air tank 8. The purpose of these valves 4, 4′ is to assure that, when the air compressor 1 ceases to supply fluid under pressure, that is when the engine is stopped, no air will flow through the conduits 4a and 3a in reverse direction thus leaving the tanks 5 and 8, de-pressurized. The diverter valve 3 assures that, if one of the tanks 5, 8 should develop a leak and thus lose its pressure, fluid produced by the air compressor 1 will not be allowed to rush into this defective tank, but will instead be shunted to the tank which is intact. The construction and operation of diverter valves of the type here indicated with reference numeral 3 is well known and is not believed to require explanation.

While the aforementioned components are common to the system as a whole, the components to be described hereafter are separated into two individual braking systems, indicated in the drawing with A and B. Discussing firstly the braking system identified as A, it will be seen that a flow progressive flow valve is associated with the air tank 5 by means of a conduit 5a on the one hand, and with two pneumatically operated brake cylinders 7 by means of a conduit 6a on the other hand. The flow valve 6 is hydraulically operated and is connected with a tandem or multiple master cylinder 13, herein assumed to be of the tandem type, by a hydraulic control circuit 6b. The master cylinder 13, in turn, is actuated by a brake pedal 14, as is evident from the drawing. The construction of the master cylinder 13 may be in accordance with the description which is to be found on pages 171–175 of the 1956 issue of "Le Freinage" by H. Perrot, N. L. Erpelding and P. H. Perrot, Editions Evrolles, 61 Blvd. Saint Germain, Paris, France.

The second pneumatic system, identified as B is similar to the system A in that the tank 8 is connected with a second progressive flow valve of the hydraulic type here indicated with reference numeral 9, via a conduit 8a. In turn, the flow valve 9 is connected with two further pneumatically operated brake cylinders 10 via a conduit 9a. Furthermore, a conduit or hydraulic control circuit 9b connects the flow valve 9 with the master cylinder 13. It is to be noted that the conduit 9b is considerably longer than the conduit 6b and that the flow valves 6 and 9 are located very close to the respective pairs of brake cylinders 7—7 and 10—10. In fact, it is preferred that the flow valves 6 and 9 be provided directly on the axles on which the wheels serviced by the respective brake cylinders are secured.

A pressure measuring device 11 of suitable construction, well known in the art, is connected with both the air tank 5 and the air tank 8, and in turn is also connected with two indicators 12 which may be located on the dashboard of the vehicle or at another point which is readily visible to the vehicle operator so that the operator can always determine whether the tanks 5 and 8 are under proper pressure. Of course, the indicators 12 can for instance be replaced by warning lights and this will be evident to those skilled in the art.

From the foregoing description and from the drawing it will now be clear that depressing of the brake pedal 14 operates the master cylinder 13. The master cylinder 13, in turn, acts upon the hydraulic control circuits 6b and 9b, through which the pressure is transmitted within a period of 2/100 or 3/100 of a second to the progressive flow valves 6 and 9, respectively. The master cylinder assures automatic balancing of the forces on these valves 6 and 9, and it will be understood that it is preferable to so arrange the master cylinder that it will act first upon the longer of the hydraulic control circuits, namely the one indicated with reference numeral 9b, the time precedence which given for the actuation of the longer over the actuation of the shorter hydraulic control circuit being so adjusted as to compensate for the slightly longer time required before the opening command is transmitted through the longer hydraulic control circuit 9b. Evidently, both of the control circuits act upon the respective flow valves 6 and 9, opening the same, so that pneumatic fluid from the tanks 5 and 8 can now reach the pairs 7—7 and 10—10 on braking cylinders, actuating the same and braking the vehicle.

The flow valves 6 and 9 are so constructed that the reaction of the air pressure of each valve is directly and fully transmitted to the brake pedal 14 and thus giving the driver the exact sensation of the braking value corresponding to the travel of the brake pedal. Of course, the pressure and volume of air displaced in the flow valves function of the strokes and of the force exercised on the balance piston.

By dividing the brake system, that is the pneumatic part thereof into the sections A and B, we make it possible to group the respective air tanks and progressive flow valves as near as possible to each of the shafts on which the wheels acted upon by the respective brake cylinders are secured, thus reducing the travel time required for the pneumatic fluid from the respective flow valve to the respective set of brake cylinders. This, coupled with the provision of the hydraulic control circuit, makes it possible to obtain an overall braking arrangement response time which is considerably lower than the one half second desired as the uppermost limit for the mechanical response time for the system.

Without further analysis, the foregoing will so fully reveal the gist of the present invention that others can by applying current knowledge readily adapt it for various applications without omitting features that, from the standpoint of prior art fairly constitute essential characteristics of the specific or generic aspects of this invention.

What is claimed as new and desired to be protected by Letters Patent and set forth in the appended claims is:

1. A braking arrangement, particularly for landborne vehicles of the type having at least a pair of front wheels and at least a pair of rear wheels, comprising pneumatically operated brake cylinder means including a first pair of brake cylinders proximal to the respective front wheels and a second pair of brake cylinders proximal to the respective rear wheels; a source of pneumatic fluid including a first pressure vessel associated with and closer to said first pair of brake cylinders than to said second pair of brake cylinders, and a second pressure vessel associated with and closer to said second pair of brake cylinders than to said first pair of brake cylinders; first and second pneumatic conduit means respectively connecting said first and second pressure vessels with said first pair and said second pair of brake cylinders; and a hydraulic control circuit, including a first normally closed hydraulic valve arranged in said first conduit means closer to said first pair of brake cylinders than to said second pair of brake cylinders, a second normally closed hydraulic valve arranged in said second conduit means closer to said second pair of brake cylinders than to said first pair of brake cylinders, first and second hydraulic conduit means respectively associated with said first and second hydraulic valves and actuating means connected with both said first and second hydraulic conduit means and operative for opening said valves through the intermediary of said hydraulic conduit means and in response to operation of said actuating means.

2. A braking arrangement as defined in claim 1, wherein said valves are progressive flow valves.

3. A braking arrangement as defined in claim 1, wherein said actuating means includes a master cylinder for opening both of said valves in response to operation of said actuating means.

4. A braking arrangement as defined in claim 3, wherein said master cylinder is farther spaced from one of said valves than from the other thereof, and wherein said hydraulic control circuit includes a first conduit connecting said master cylinder with said one valve and a second circuit shorter than said first conduit and connecting said master cylinder with said other valve, said master cylinder being arranged to act first upon said first conduit so as to compensate for the difference in length between the same and said second conduit whereby to achieve substantially simultaneous opening of said valves.

References Cited

UNITED STATES PATENTS

| | | | |
|---|---|---|---|
| 2,024,343 | 12/1935 | Eaton | 303—7 |
| 3,018,786 | 1/1962 | Stratton | 137—118 |
| 3,227,494 | 1/1966 | Alfieri | 303—52 XR |

FOREIGN PATENTS

| | | |
|---|---|---|
| 539,895 | 9/1941 | Great Britain. |

MILTON BUCHLER, *Primary Examiner.*

JOHN J. McLAUGHLIN, Jr., *Assistant Examiner.*

U.S. Cl. X.R.

303—2, 7, 13, 40, 52